May 15, 1956  G. A. D. TOUVET  2,745,311
ELECTRONIC EMISSION SPECTROMETRY USING RADIO FREQUENCY
EXCITED AND MODULATED LIGHT EMISSION SPECTRUM
Filed July 6, 1951  4 Sheets-Sheet 1

INVENTOR
GUY A. D. TOUVET,

BY Robert B Pearson
ATTORNEY

United States Patent Office 2,745,311
Patented May 15, 1956

2,745,311

ELECTRONIC EMISSION SPECTROMETRY USING RADIO FREQUENCY EXCITED AND MODULATED LIGHT EMISSION SPECTRUM

Guy A. D. Touvet, Orleans, France

Application July 6, 1951, Serial No. 235,503

29 Claims. (Cl. 88—14)

This invention relates to spectrometers adapted to provide indirect visual observation of the spectrum by electronic means, and more particularly to such a spectrometer as will provide instantaneous observation of the absorption and emission spectrum curves of samples of substance. Spectrometers designed in accordance with the invention give the shape of these curves for a part of the light spectrum so as to provide for a qualitative and quantitative study of the spectrum. Moreover, they are especially utilizable for analysis in the invisible part of the light spectrum.

The invention departs in many respects from prior known spectrometers. In the first place the light source is a gas or vapor tube excited in radio frequency so as to deliver light radiation of high level intensity in pulses of light as will be explained presently. The light from the source so excited passes through an optical system which may comprise a convex lens, a slit and another lens or lenses, the system forming in effect a collimator by which the light from the slit is rendered parallel before it strikes a prism or the like. The prism comprises a part of a dispersing system, which may include other lens or lenses whose purpose is to cause the beam coming from the prism to diverge or spread.

A second slit is placed in the path of the beam, the purpose of the dispersing system and slit being to produce an enlarged image of the spectrum so that the second slit can isolate a part of the beam which passes therethrough to a photoelectric light sensitive element. The photoelectric element is connected to the amplifier of a radio receiver which directly feeds a cathode ray oscilloscope.

In the case of the absorption spectrum, the transparent substance to be analyzed, which may be solid or liquid, is disposed in the path of the beam of parallel light before it reaches the prism, or it may be positioned at other points in the system as will be later described.

A separation of the spectrum on the screen of the oscilloscope corresponds to a given difference in wave lengths. This is usually referred to as linear dispersion and in the apparatus is provided by the horizontal displacement given to the spot on the cathode ray tube screen by electronic controls in the system.

Perpendicular displacement of the spot of the cathode ray oscilloscope, that is of the beam of the scope is correlated to the angular position of the prism by mechanical and electrical means in such manner that the displacement of the spot is a function of the position of the prism as it rotates. One pair of plates in the oscilloscope is electrically controlled depending on such position while the other pair of plates in the oscilloscope is affected by the output of the amplifier i. e. a radio-frequency receiver.

The different output signals of the amplifier i. e. of the radio receiver, are thus computed on the cathode ray oscilloscope and appear on its screen in the form of a curve which is the exact curve of absorption or emission of the sample, which is being analyzed for a spread band of light radiation. In other words, the measurement is made of the light absorbed and emitted or transmitted at different wave lengths by the material under test. Electronic means being used, the response is instantaneous, and the shape of the curve is immediately and automatically registered.

It is a general object of the invention to provide a spectrometer which so functions. These and other objects and advantages of the invention will become more apparent from the following description and claims when read in conjunction with the accompanying drawings in which:

Before describing one or more specific embodiments of the invention some specific remarks should be directed to the use which the invention makes of light which has been modulated by radio-frequency. It has already been intimated that the light source employed may be a gas or vapor tube. When such light source is one or more of the rare gases such as xenon, helium, neon, or krypton at low pressure in an electrical discharge tube, and such, in accordance with the invention, is energized with radio-frequency, such radio-frequency excitation causes an increase in radiation in some particular portion of the spectrum depending on the gas or vapor and frequency in use. Moreover, it broadens the line spectrum into a band spectrum; enhances the radiation of lines which are of very low amplitude with conventional excitation; and permits greater electric current densities in the tube with the resulting increased light power output and without distortion or overloading of the modulation.

Such band spectrum is obtained according to certain value conditions involving the shape and characteristics of the gas tube, the frequency, the wave-form and the peak intensity of the exciting current and reference will be made later on in this respect to my Patent No. 2,538,062.

Such light band is necessary when the absorption spectrum of a sample is to be studied so as to be able to observe the absorption of the sample for successive different light frequencies.

A line spectrum of the source is obtained when the above mentioned value conditions are not fulfilled.

In both cases, the light radiation is radio-frequency modulated.

For studying the emission spectrum, both lines or band spectrum can be utilized depending on the analysis carried out qualitatively or quantitatively.

Generally, a line spectrum helps for a qualitative analysis and is sufficient for a quantitative analysis, but a band spectrum can give a still more definite and exact result when extremely precise and delicate quantitative analysis is required.

So when the emission spectrum of a sample is to be studied the same type of excitation is applied. The excited vapor will be the vapor resulting from partial disintegration of the electrodes of the tube, these electrodes being made of the sample to be studied as will be explained more fully below.

Such a method of producing light with enhanced radiation properties as referred to above has been described in my Patent 2,538,062, to which reference may be made. Such method takes advantage of the ionisation of the gas or vapor by induction produced by the exciting current itself. It is of course apparent that the shape of the tube, the wave form and the intensity of the exciting current are all important factors.

It seems clear that the gas molecules are accelerated and that there is an increase and decrease in acceleration during a radio-frequency cycle of excitation (or a part of such cycle if the excitation is class C). In theory, the electrons are very probably submitted to a certain action during excitation, the result being a redistribution of energy in the spectrum and the enlargement of certain rays of the spectrum into a band of light. The emission is enhanced in a certain part of the spectrum and it is possible to localize greater energy in a definite light band, thus resulting in a notable increase of the tube efficiency for a certain wave length.

It should be noted that the gas or vapor tubes can be used with various types of oscillation circuits including auto oscillation circuits described in connection with Fig. 15 of my Patent No. 2,538,062.

Said circuits can provide pulse operation combined with radio frequency auto-oscillation of the source. As well they can also provide periodical high peak intensity excitation to produce periodical peaks of high level light intensity and radiation. So light pulses of very short time constant can be provoked which improves the overall sensitivity and accuracy of the equipment.

Consequently, in accordance with the invention it is possible to produce a well defined band of light in a very precise part of the spectrum, even in the long infra-red part of the spectrum. Filtering the band of light to obtain only a desired light frequency or band of light frequencies, if necessary, and spreading of the band's spectrum, thus becomes easier.

Figure 1:
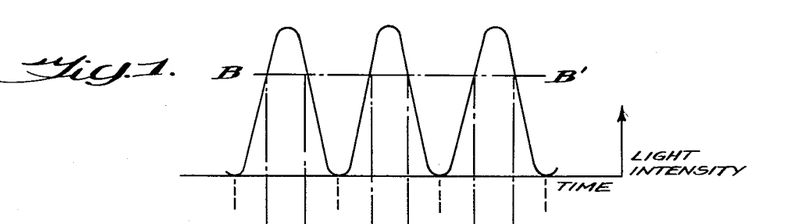
Figs. 1 and 2 are graphs illustrating wave forms.
Figure 2:
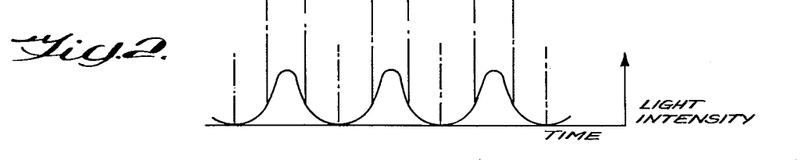

When a substance is being examined using the absorption method with a spectrometer made in accordance with the invention, the transparency of that substance to the light which has been excited by radio-frequency gives a different sensitivity of measurement than if a constant level light had been used because the radio-frequency excited light generally provides a peak and varies in intensity during a cycle. With such light passing through the substance being examined, and depending upon its characteristics, a clear variation in amplitude or intensity is not obtained as if the light were cut along the line B—B' of Fig. 1 to obtain discrete intermittent pulses of light. Instead it takes the shape illustrated diagrammatically in Fig. 2. With an ordinary direct constant level light, the result can only correspond to a constant lower level due to absorption of the light of the constant amplitude light source.

In other words, with the present invention, the transparency is obtained for a series of different values of intensity during a radio-frequency cycle of excitation of the light source. The intensity peaks can be made high if necessary, but a more sensitive effect is obtained because not only is the maximum peak reduced (as would be a constant level light) but also because below a certain value during the cycle, the absorption is so completely effective that it can be said to reach the point during each cycle where no more light is transmitted through the substance. It is possible to compare this level with the maximum amplitude of the radio-frequency excited light which comes out of the sample, such measurement being easy and accurate, being the amplitude of a radio-frequency carrier.

Another advantage of using such light is that generally a constant peak amplitude of radiation is obtained for a small portion of the spectrum. The light source employed, however, results in a band of light between well defined wave lengths, the shape of which band is known. Any portion of the spectrum can be observed, or successive portions one after the other. The observation of the infra-red spectrum is most interesting.

Figure 3:
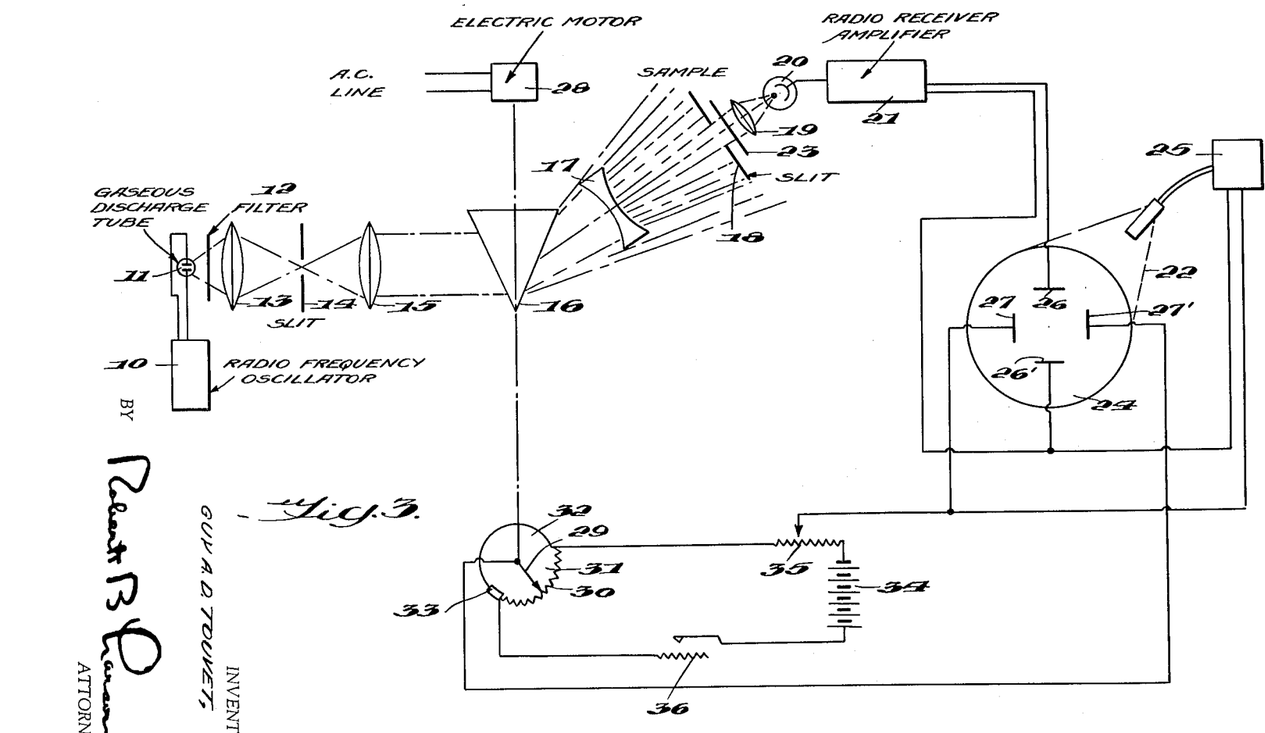
Fig. 3 is a diagrammatic representation of one system for carrying out the invention.

One system for studying the absorption spectrum is diagrammatically illustrated in Fig. 3. It includes a radio-frequency oscillator 10 operating at a radio-frequency F and connected to excite a gas or vapor tube 11. The tube 11 preferably is a gaseous discharge tube containing a rare gas such as xenon, helium, neon, or krypton at low pressure, although other gases or vapors may be employed as referred to in my Patent No. 2,559,688 issued July 10, 1951. As previously mentioned such radio-frequency excitation causes an increase in radiation in some particular portion of the spectrum depending on the gas and frequency used. A filter 12 may be placed in front of the light source, if desired, to cut out undesirable light and restrict the light even more definitely to the particular portion of the spectrum with which it is desired to work.

The light from the source is passed through an optical system comprising, for example, a convex lens 13, which is adapted to concentrate the light on the slit 14 which is placed in the focal plane of a lens 15.

The lens 15 (or a system of lenses) receives the light from the slit 14 and gives it the form of a parallel beam. The lens 13, the slit 14, and the lens 15, form in effect a collimator by which the light from the slit is rendered parallel by the lens 15 before striking a prism 16.

The prism 16 comprises a dispersing system which is adapted to spread the band of light which it intercepts. Instead of a prism, a diffraction grating may be used, as is known in the art. Depending on how the dispersing system is constituted and utilized, in certain cases it will be found that it will not be necessary to employ the filter 12 at all.

The invention employs a divergent lens or a system of lenses 17 to cause a still greater divergence of the beam of light which emerges from the prism 16. The purpose of such further divergence is to produce an enlarged image of that portion of the spectrum so that a second slit 18 can isolate only a small beam or part thereof. The small beam which passes through the slit 18 strikes a lens 19 which converges the small beam on a light sensitive element such as the photoelectric cell 20. The photoelectric cell 20 is, as indicated, placed in the focal plane of the complex optical system just described. It is connected to the amplifier 21 of a radio receiver, which amplifies the output of the photoelectric cell 20 and feeds it directly to a cathode ray oscilloscope 22.

The output of the photoelectric cell 20 is in terms of radio-frequency impulses as will be commented later on and can be tuned to the main frequency F of the exciting current of the gas tube 11, or to a multiple frequency of this main frequency, that is to a harmonic of the main frequency. Preferably the amplifier 21 should be tuned on one harmonic of the frequency F so as to avoid direct pick-up from the oscillator 10. The invention employs a radio-frequency carrier in case of very slow variations of the amplitude of the light which is picked up by the photoelectric cell 20, and thus the amplification is made easier and more stable. This should be extremely difficult with ordinary light in which case it would be necessary to utilize a direct current amplifier. In case of variations of extremely short duration (absorption ray) affecting the light which is picked up by the photoelectric cell, the response depends only on the bandpass of the radio-frequency receiver 21.

The substance to be analyzed which may be an inorganic or organic solid or liquid, is interposed in the path of the beam of parallel light before it reaches the prism 16, or it may be disposed in place of the filter 12, or as shown in Fig. 3, it may be between the slit 18 and the converging lens 19, where it is indicated by the reference numeral 23.

The cathode ray oscilloscope 22 may be of the usual type which is comprised of a vacuum tube one end of which, called the screen 24, is painted on the inside with a fluorescent material. A current of electrons flows from the negative terminal of the tube past a grid in a straight beam toward the fluorescent screen. Then the beam strikes the screen, it excites the fluorescent material, producing a spot of light. The required supply for the tube 22 is indicated in the drawings (Fig. 3) by the reference numeral 25.

The cathode ray oscilloscope is also fitted with two pairs of parallel plates 26, 26', and 27, 27', as is usual, for applying mutually perpendicular transverse electrical fields to the cathode ray beam. Since the deflections of the bright spot on the fluorescent screen due to these two fields are at right angles to each other, it is possible to cause the spot to trace any desired curve by applying suitably varying potentials to the two sets of plates 26, 26' and 27, 27'. In the present instance varying potentials are applied to the two sets of plates so that the spot is caused to trace the absorption spectrum curve of the sample of substance being examined.

To obtain displacement of the spot of the oscilloscope so as to cause it to trace the curve as referred to above, the prism 16 is mechanically coupled to an electric motor 28, which for example, turns at twenty-four revolutions per second. The motor 28, the prism 16, and a rotating contact 29 on a variable resistance 30 connected in a potentiometer 31, may all be disposed on a common axis so that the prism 16 and the contact 29 are driven by the motor 28 at the same speed as the motor. In other words, the prism 16 and the contact 29 should both be rotated by the motor 28 at the same speed as the motor. The potentiometer 31 includes the resistance 30, a flat surface 32, and an insulated portion 33, all disposed in a circle and all adapted to be contacted by the rotating contact 29 as the latter revolves.

The resistance 30 and the flat surface contact 32 are fed by a direct current source, such as the battery 34, through a second potentiometer 35. The other end of the resistance 30 is connected with the battery 34 through a variable resistance 36.

As will be noted from Fig. 3, one of the plates 27' of the pair 27, 27' of the oscilloscope 22 is connected directly with the rotating contact 29, while the other plate 27 of this pair is connected to the potentiometer 35. The other pair of plates 26, 26' of the oscilloscope 22 is connected to receive the output from the radio receiver 21.

The potentiometer 35 permits adjustment of the spot of the oscilloscope to a zero position. The variable resistance 36 in the circuit of the battery 34 and value of the potentiometers 31 and 35, permits variation of the amount of the displacement of the spot as a function of the position of the contact 29. The position of the rotating contact 29 (which corresponds with the angular position of the prism 16) thus determines the position of the spot in one direction while the output of the amplifier 21 determines the position of the spot in the other direction. The flat contact 32 over which the contact 29 rides in engagement therewith, allows the spot to remain in the same position at the end of one exploration of the spectrum. The little insulated portion 33 (or in lieu thereof a very high resistance) permits the contact 29 to move the spot back to the starting point after one exploration.

A synchronous motor could be employed to synchronize the sweep of the cathode ray oscilloscope. The speed of the motor being for example 1460 R. P. M., twenty-four explorations of the spectrum (that is, of the desired part of it) are made each second. A steady curve is obtained on the screen which corresponds to twenty-four pictures per second. If the dispersing system is a prism, as here shown, it can be arranged that each of the three sides of the revolving prism 16 will correspond to successive explorations of the spectrum.

With respect to the speed of the motor 28, it should be clear that if the screen of the oscilloscope has a certain remanence or retentivity, it will not be necessary to have twenty-four explorations per second. Depending on the remanence, ten or even less explorations per second might be sufficient without any flickering. The image being a non-moving one, a steady curve and better luminosity can sometimes be obtained with a smaller number of images per second.

Some additional remarks will be made on the effect of periodically increasing and decreasing light on a photosensitive element, i. e., on the effect of radio-frequency modulated light or of pulses of light periodically repeated on said photosensitive element. The current in the output of a photosensitive element is never reversed. It is in terms of increasing and decreasing current, i. e., in terms of radio-frequency impulses or of periodical pulses as mentioned in my Patent 2,538,062, Fig. 17, column 7.

If a resistance and capacity coupling was used, according to value of high resistance and of capacity required for normal efficiency, it would be possible above certain frequency, that the coupling condenser would have no time to discharge in between two pulses of current. Resistance and value of the condenser should have to be selected of too small value for certain frequencies, the result being a complete loss of efficiency.

This was one of the reasons for which a tuned circuit was preferred as output circuit of the photosensitive element.

On another point of view, such resonant circuit including a condenser and an inductance utilizes the charge and discharge of the tuning condenser; the energy tanked in the condenser exchanging with the energy in the inductance and provoking oscillations with charge and discharge of the condenser. This constitutes one way to utilize and to measure for each pulse of current the charge of the condenser disposed in the output circuit of the photosensitive element. The current pulses in the photosensitive element output circuit being regularly repeated according to the modulation of the light, damping is compensated and the oscillation of the above tuned resonant circuit is continuous, it corresponds to repeated measurement corresponding to each pulse of light permitting more accuracy and easy comparison in between two distinct measurements.

The measurement of the output tension delivered by the tuned circuit (step up being taken into account) constitutes a relative measurement of the charge of the tuning condenser produced by the non-reversed output current of the photosensitive element during a pulse or an impulse of light.

Considering now the shape of the light for different classes of radio-frequency excitation in which respect reference may be made to columns 2 and 3 of my Patent 2,538,062, the light shape will determine the shape of the current impulses in the output circuit of the photosensitive element.

The above explanations show clearly the reasons for choice of a resonant tank circuit as output of the photosensitive element and for choice of the tuning frequency of said tank circuit.

This tuning is naturally made according to the frequency of the successive pulses of current in the output circuit of the photosensitive element, i. e. according to the frequency of the succesive charges of the condenser of the tank circuit. Reference can be made in respect with the tuning frequency to Patent 2,538,062 and to my U. S. copending application Serial No. 763,349 (filed July 24, 1947, now Patent No. 2,559,688, issued July 10, 1951), for example on the main frequency of the pulses of light or on an harmonic.

Reception of a very small flux of periodically increasing and decreasing light of the source, that is of a very small part of a light pulse, such as for example of a small part of the dispersed light in the present spectrometer arrangement, by means of an electron multiplier in combination with such resonant tank circuit, is described Fig. 17, column 7 of my Patent 2,538,062. Reference is also made to paragraph *h*, columns 9 and 10 of said patent in respect with this detecting system. It corresponds to increasing and decreasing output current of the electron multiplier without reversion of said current during a pulse of light. Such overall operation is solely allowed by the use of increasing and decreasing light of the source, such as a pulse of light.

In other words, output current of the photosensitive element excites the resonant circuit. It corresponds to excitation of a circuit in terms of pulsed current and to utilization of adequate circuit to use such type of current. The above remarks and explanations have their importance as it is shown how measurement is carried out in the present invention of the amount of light radiation picked up by the photosensitive element.

Perhaps certain additional remarks should be directed in relation with the tuning of the amplifier 21. The RF amplifier can be tuned on the same frequency F of the oscillator 10, or on a multiple of the frequency F. The oscillator 10 should be designed so as to have as few harmonics as possible, when the R. F. amplifier 21 is to be tuned on one harmonic due to the shape of the light emitted. For this purpose the radio circuit (tank circuits of the oscillator 10) is provided with as big a capacity as possible to reduce the impedance for harmonics and their amplitude. Consequently the chances of direct pick-up by the amplifier 21 are reduced. This is naturally irrespective of the most careful shielding which of course should be used.

Generally, it is best not to connect the ground connection of the amplifier 21 with the ground connection of the oscillator 10. On the contrary, it is better to provide the most elaborate radio-frequency insulation of one with respect to the other. With respect to the frequency to which the amplifier 21 should be tuned, it depends on how the gas tube 11 is excited and in this connection reference may be made to my (copending application Serial No. 645,626, filed February 5, 1946), Patent No. 2,538,062.

Since they are of main importance, some remarks will be directed to the dispersion and to the resolving power of the apparatus which has been described. The theoretical resolving power is dependent mainly on the dispersion and on the characteristics of the dispersion system. The practical resolving power which corresponds to spectral purity and intensity depends on the width of the first slit 14. As described, the invention has found it useful to increase the practical resolving power, by disposing a second slit (the slit 18) in front of the photoelectric cell 20, or more exactly in the path of the divergent optical system which directs the beam to the second slit. Extremely small fields can thus be obtained for the electrical exploration of the spectrum, this being highly desirable in connection with the study of emission spectra.

Purity is generally at the most twenty percent less than the theoretical resolving power (maximum). Divergence of the divergent optical in front of the second slit and opening width of the second slit (which is about ten times the opening of the first slit) are arranged so that they correspond at least to the theoretical maximum resolving power. Then there is no diminution in spectral purity but an improvement.

Figure 4:
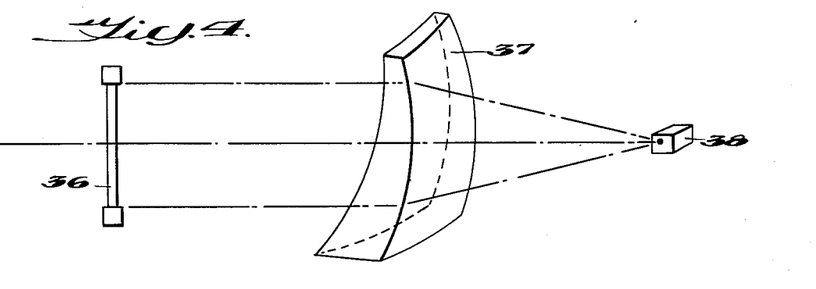
Fig. 4 is a diagrammatic representation of means for transforming the non-point light source into a form approximating a point source.

It is realized that the gaseous discharge tube is a non-point source of light, although special shapes of tubing may be used to make the light more similar to that which would come from a point source. In accordance with one phase of the invention, the light emitted from the gas tube may, however, be transformed into practically a point source. Such an arrangement is illustrated in Fig. 4 diagrammatically. In this figure, the gas tube 36 is disposed in front of a distorting optical system 37, the form, construction and position of which are such that the rays emitted by the tube and falling on the said optical system 37 are focussed into an image, which is approximately a point image 38 and which is produced at a determinated point. The form of the optical system and its position control can be so designed that the image 38 has practically the same dimensions as to width and height. Thus all the luminous flux emitted by the gaseous discharge tube which falls on the deforming optical system is focussed and good brilliancy is obtained at point 38. This image 38 can, for example, be positioned in the system illustrated in Fig. 3, at the same point where the gaseous tube 11 is positioned in that figure. The use of such an arrangement will, it will now be evident, improve the results of the system. It is understood that any skilled person in the art will be able to construct such a distorting optical system and that consequently no detailed explanation thereof need be given here.

It should now be clear that spectrometers constructed in accordance with the present invention differ greatly from prior known spectrometers.

First of all there is use in the present invention of light from a gas or vapor tube which has been excited with radio-frequency. The advantages of that have been referred to and should now be evident.

Secondly, spectrometers constructed in accordance with the present invention are different with respect to the manner of observation of the spectrum. As should now be evident, the system permits the detection, selectively, of the light radiation, the whole receiver being only sensitive to such emission of light. In other words, compared to other systems, the signal to noise ratio is increased and greater sensitivity is allowed. The response of the receiver for any kind of modulation of such radio-frequency excited light can be extremely high, as high as in any normal radio receiver. As a result, amplification in radio-frequency is utilized. Compared to other systems the present system obtains a considerably increased sensitivity, greater fidelity, and greater accuracy of the analysis of the transparency of a substance being examined for the light radiations of different wave lengths.

The above paragraph applies for any kind of radio-frequency modulated light, i. e. for light bands or monochromatic light rays, that is same advantages are obtained in the case of a study of an emission spectrum of lines as will be explained later on.

Thirdly, the present invention differs from prior systems in that, in addition to the dispersion of the light by optical elements, it effects a further spreading of the spectrum by electronic means by amplification of selected light frequencies varying in amplitude at radio-frequency and in such manner that such electronic spreading can be adjusted at will by control of the oscilloscope. Great enlargement of even very narrow bands of light, and continuous inspection of the spectrum can thus be obtained. The choice of the light band according to the substance being so examined, its dispersion and the electrical spreading of the spectrum are some of the main points of importance. It should now be appreciated that the number of "accidents" of the spectrum can be observed with this system when with other systems they are not even noticeable, and consequently more accurate observation can be made with the invention.

Fourthly, the present invention differs from other known systems in that it provides for visual observation on the screen of a cathode ray oscilloscope. The results, that is, the different output signals from the receiver-amplifier are computed on the oscilloscope and appear on its screen in the form of a curve which is the exact curve of absorption of the product which is being analyzed for a spread band of light radiation. In other words, the measurement is made of the light absorbed and transmitted at different wave lengths by the material under test. Electronic means being used, the result is instantaneous, and the shape of the curve is immediately and automatically registered.

As exposed later on, system of Fig. 3 can readily be used for emission spectrum analysis and the above differences with prior known spectrometers applies as well for method of absorption spectrometry analysis and of emission spectrometry analysis.

The identification of the lines on the screen is made by comparison with the spectra of known elements. Calibration of the screen and interpolation can be made. This comparison spectra can be the spectra of the source itself when the rays are rays which are easy to spot out, i. e. observing the lines of emission of the source. In this case the comparison spectra is the fundamental spectrum of lines instead of band. Such spectrum of lines is obtained by exciting the gas or vapor tube under rating and value conditions which does not provoke any change in the emission spectrum of the gas tube. In this manner observation of lines of emission can readily be made with the present system.

Finally, for any wave length, visible or invisible, of the light spectrum, a curve is obtained in visible form on the screen of the oscilloscope. This is especially interesting for the invisible part of the spectrum because it makes possible not only direct vision of an invisible part of the spectrum but also a photographing thereof. No plotting of absorption or emission curve is necessary, but direct and instantaneous vision is attained.

With the present invention, up to the present time, it has been possible to realize in the infra-red part of the spectrum, an inspection up to $9\mu$, and it is believed possible to go farther, if necessary even up to $15\mu$ with the proper type of gas tube, the proper type of gas, the correct radio-frequency excitation, and adequate light sensitive elements replacing the photoelectric cells.

Absorption method of spectrometry analysis is utilized with substances or materials sufficiently transparent to visible or invisible radiation.

For other substances, such as metallics or non-transparent substances susceptible to stand a spark discharge, the emission method for spectrometry analysis is utilized.

The present application applies for both methods.

The system described can readily be used for analysis and comparison of emission lines of samples as will be seen with reference to Figs. 6 to 10. Any kind of light source, pulsed or modulated in radio-frequency, can be substituted for the gas tube 11 of Fig. 3, and the lines obtained therefrom can be observed on the oscilloscope 24.

Figure 6:
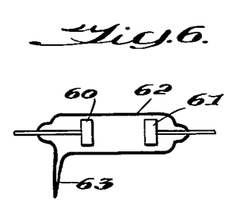
Fig. 6 is a sectional view of a tube used in the study of the emission spectrum.

The tube shown in Fig. 6 could be used as a source to study the emission lines of a sample. The two electrodes 60 and 61 are composed of the sample material under test, and are housed in a glass jacket 62. The electrodes can be two small discs of the same diameter spaced from each other as shown. For purposes of accurate comparison, the discs in the various sample sources should be equally spaced.

In operation, a vacuum is created in the tube through exhaust pipe 63, before the test, that is, before a spark is established. Creating a vacuum in the tube prior to discharge is advantageous in that it provides for the greater accuracy and sensitivity necessary when analyzing samples having small percentage components: If the vacuum were not first created, the resulting spectrum might contain traces of substances in the tube atmosphere but not resulting from vaporization of the sample. A spark is established, vaporizing the sample material in discs 60 and 61 thus providing a vapor pressure in the tube. The vapor, of course, consists of molecules of the sample material.

Radio-frequency oscillator 10, in Fig. 3, excites the vapor in the manner described above in connection with gaseous discharge tube 11.

Figure 7:
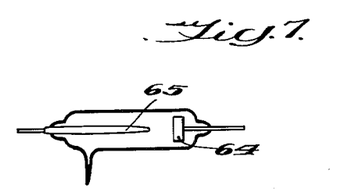
Fig. 7 is a sectional view of another embodiment of the tube of Fig. 6.

Another embodiment of the emission source is shown in Fig. 7 in which the tube contains one electrode 64 having a disc shape similar to that of the electrodes in the tube in Fig. 6. The second electrode is in the form of a pin 65.

Figure 8:
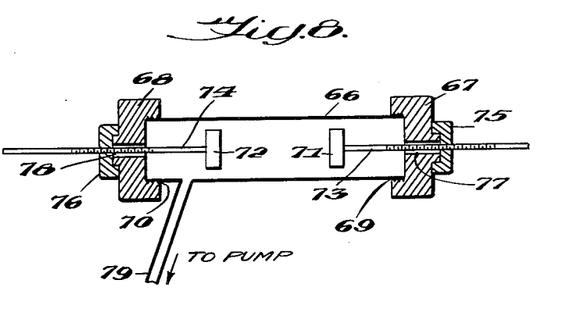
Fig. 8 is a sectional view of a further embodiment of the tube of Fig. 6.

A further variation of the emission source is shown in Fig. 8. This tube is readily assembled and disassembled into its component parts so that one tube can conveniently be used for successive analyses of a plurality of samples.

The glass jacket 66 is closed at either end by closure members 67 and 68 which engage the surfaces of the end portions of jackets 66 to form vacuumtight seals at 69 and 70. The samples 71 and 72 are attached to rods 73 and 74 which are in turn connected to tube caps 75 and 76 by means of screw threads or any other convenient vacuum tight means. Caps 75 and 76 are in turn connected to closures 67 and 68 to form a vacuum seal around the openings 77 and 78 in the closures.

Exhaust pipe 79 extends outwardly from glass jacket 66 and communicates with the interior thereof. A vacuum pump (not shown) can be connected to exhaust pipe 79 to create the desired vacuum. It is advisable to have a pressure gage of some type interposed in the system to indicate at all times the degree of vacuum in the tube.

In operation, the tube is exhausted and the spark between the sample electrodes is started. There is vaporization of the electrodes and the pressure inside the sample tube increases. This pressure is maintained during the analysis, at a desired level through the action of the exhaust pump.

The temperature of the discharge sample tube, when necessary, can be controlled without difficulty by means of a double external envelope. Such an envelope would surround jacket 66 without communication with the interior thereof and would present a large surface area for heat dissipation. The space between the envelope and jacket 66 can be filled with a gas or air which would transfer the heat from the sample to the envelope for radiation therefrom.

Figure 9:
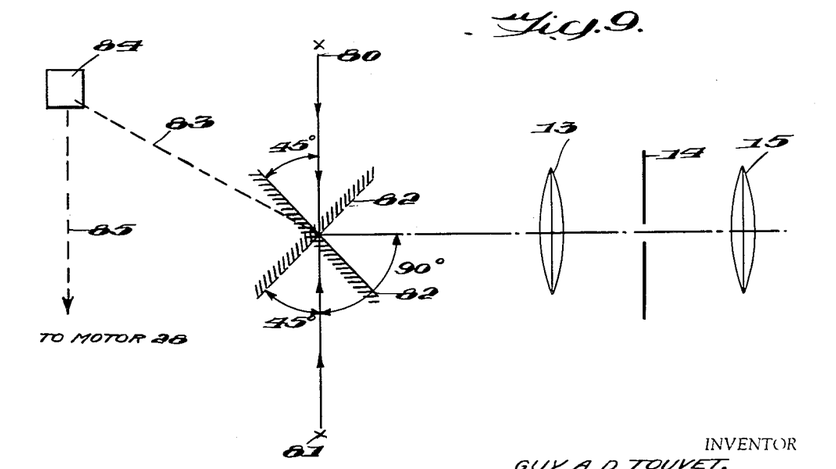
Fig. 9 is a diagrammatic representation of a system for comparing the spectrum curves of two samples.
Figure 10:
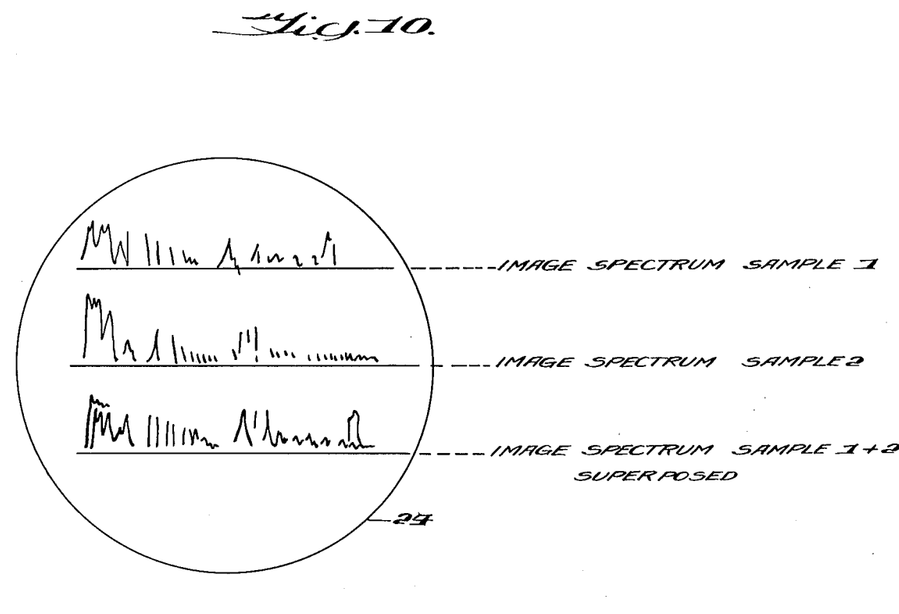
Fig. 10 shows graphs illustrating the comparison between two curves.

The system of Fig. 9 is used to compare the spectrum curves of two samples to obtain simultaneously the curves shown in Fig. 10. Two samples 80 and 81 are spaced from each other and a flat mirror 82 is rotatably mounted midway between the two samples so that the light rays from the samples, when striking the mirror surface, will be reflected through the collimator system of Fig. 3. Link 83, mechanical connection 84 and link 85 connect mirror 82 to motor 28 for rotation. Mirror 82 will occupy alternately two positions at 45° angle to the axis of the collimator sending, alternately, light from sample 80 or 81 during one complete revolution of the prism 16.

The intermittent rotational movement from one position to the other of the mirror is caused by the linkage between the mirror and motor 28, while the mechanical connection 84 controls the proper angular position of the mirror. Such a flat plane mirror can be stopped at will to observe the image of the spectrum of either sample.

The system above permits the two samples to be connected in series and fed continuously during test with exactly the same current and frequency, thereby greatly improving the accuracy of comparison.

By utilizing a conventional electronic switching arrangement, and relying on the retentivity of the oscilloscope screen 24 it is possible to obtain on the scope at the same time, the spectrum image of sample 80, the spectrum image of sample 81; and both images superposed as shown in Fig. 10. This will provide a very quick and accurate qualitative and quantitative observation.

Another and perhaps a more simplified system consists in connecting sample source 80 and sample source 81, by means of an adequate rotating support and contacts, to the radio-frequency circuits, each source alternately taking the place of gas tube 11 of Fig. 3.

The system described in only one simple sample of realization of the invention and now that the invention has been disclosed other types of circuits and arrangements will be found possible of use either for the excitation of the source in radio-frequency either for the ultization of the currents in the overall output circuit of the photosensitive element which output current results from the utilization of said radio-frequency excited light.

It should now be evident that the invention can be very useful for certain types of chemical analysis, for qualitative examination of material for purpose of identification; to test the presence or absence of specific constituents or impurities or essential or minor constituents of materials and also for quantitative analysis of the same, utilization of pulses of light improving overall sensitivity of the equipment and detection of such components of low percentage.

In the medical field, the system is so sensitive that blood can be tested and compared. The apparatus can help to obtain an almost immediate diagnosis of the patient. The process by comparison to already tested and well established characteristics curves of reference should detect any intoxication of chemical order or inform of the presence of abnormal chemicals. Moreover, it can give a definite reply with respect to certain diseases which affect the blood and which give absorption curves of well defined shape (especially the infra-red region of the spectrum).

Figure 5:
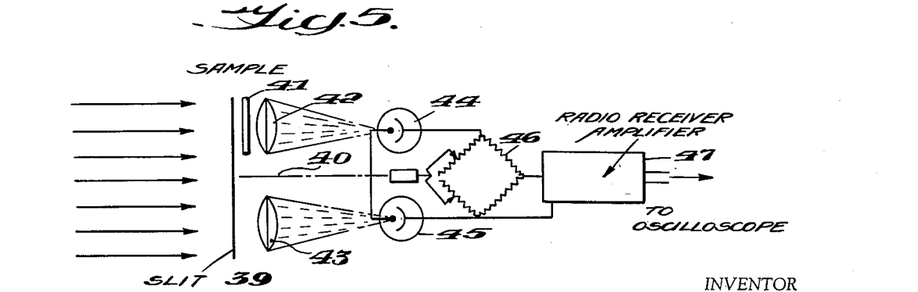
Fig. 5 is a diagrammatic representation of another system in accordance with the invention.

Another type of system is disclosed in Fig. 5 which shows a system providing comparison of the light beam intensity without absorption and with absorption, the output being a relation with the proportion of both. This system can be useful when the peak of the intensity of the light produced by the source in the portion of the spectrum in which the observation is carried out, is not constant in the full band. Then a relative measurement is made in the following way. The light taken by the optical system from the same area of the source and after passing through a slit 39, is divided by a partition 40 into two beams. These are directed as two parallel beams and the sample 41 is placed in one of them. Both beams then pass through converging lenses 42, 43. The photoelectric cell 44 receives the attenuated beam, while the photoelectric cell 45 receives the non-attenuated beam.

These two identical photoelectric cells 44 and 45 feed an electrical bridge 46. A balanced adjustment allows the balancing of the two photoelectric cells so that they have the same sensitivity when receiving the same beam intensity. The output from the bridge 46 is fed to the amplifier 47 which may be similar to that used in the apparatus of Fig. 3. The amplified outputs are then conveyed to an oscilloscope in a manner similar to that of Fig. 3.

Sometimes it can be made interesting to cause the beam which is picked up by photoelectric cell 45 to first pass through a calibrated absorption sample or cell to match the other beam and to check the exact matching with the scope.

With such a system as illustrated in Fig. 5, in the case that radiation from the source is not constant throughout all the band explored, or in the case that response and sensitivity of the light sensitive photoelectric cells are not constant, it is easy to realize that correct proportion and measurement is obtained. Particular sensitivity of response of a photosensitive element for different wave length is cancelled out.

The system of Fig. 5 can also be useful when the absorption of a substance has to be compared to the absorption of a known substance. In this case as previously mentioned for calibrated absorption cell, one of the substances is placed in the path of the part of the beam which is picked up by photoelectric cell 45 and the other in the path of the part of the beam which is picked up by photoelectric cell 44. Relative absorption of one substance with respect to the other can then be determined.

Now that this embodiment has been disclosed many different types of circuits can be designed for connecting the two photoelectric cells and their amplifier to the oscilloscope.

When in the claims it is stated that the light is modulated at radio-frequency, the term "light" is intended to include wave energy or radiation. As such it would include light which is not visible to the naked eye, such as infra-red and ultra-violet light. The reference to light varying in amplitude at radio-frequency is intended to mean that the intensity of the light is periodically varied at a radio-frequency.

I claim:

1. A method of emission spectrometry analysis comprising the steps of subjecting a vapor consisting of the substance to be analysed to a radio frequency excitation, detecting and converting the light resulting from said excitation to an electric current of radio-frequency having amplitude variations at a frequency corresponding to the radio-frequency excitation and varying in amplitude intensities for the different light frequencies of the light radiation in accordance with the characteristic emission spectrum of the substance, whereby the emission spectrum of the substance is indicated by amplitude variations of said radio-frequency current.

2. A method of emission spectrometry analysis comprising the steps of subjecting a vapor consisting of the substance to be analyzed to a radio-frequency excitation, detecting and converting the light resulting from said excitation to an electric current of radio-frequency having amplitude variations at a frequency corresponding to the radio-frequency excitation and varying in amplitude intensities for the different light frequencies of the light radiation in accordance with the characteristic emission spectrum of the substance, and amplifying said radio-frequency current, whereby the emission spectrum of the substance is indicated by amplitude variations of said radio-frequency current.

3. A method of emission spectrometry analysis comprising the steps of periodically subjecting a vapor consisting of the substance to be analyzed to a radio-frequency excitation, detecting and converting the light resulting from said excitation to an electric current having amplitude variations at a frequency corresponding to the periodical excitation and varying in amplitude intensities for the different light frequencies of the light radiation in accordance with the characteristic emission spectrum of the substance and measuring the results in terms of the functions of the intensity of said periodical electric current and of the period during which the radio-frequency excitation is applied, whereby the emission spectrum of the substance is indicated by amplitude variations of said periodical current.

4. A method of emission spectrometry analysis in which the emission source consists of a tube at least one electrode of which is the sample to be analyzed, comprising the steps of partially vaporizing the sample electrode, subjecting the vapor to a radio-frequency excitation, detecting and converting the light resulting from said excitation to an electric current of radio-frequency having amplitude variations at a frequency corresponding to the radio-frequency excitation and varying in amplitude intensities for the different light frequencies of light radiation in accordance with the characteristic emission spectrum of the substance, whereby the emission spectrum of the substance is indicated by amplitude variations of said radio-frequency current.

5. The method of claim 4, in which the tube is evacuated prior to the vaporization of the sample.

6. The method of claim 4, and amplifying said radio-frequency current prior to the indication of the emission spectrum.

7. A method of emission spectrometry comprising the steps of subjecting a vapor consisting of the substance to be analyzed to a radio-frequency excitation to produce radiation of light frequencies modulated to vary in amplitude at radio-frequency, dispersing said light frequencies, isolating a portion of said dispersed light, detecting and converting the isolated portion of light into an electric signal varying in amplitude at radio-frequency and proportional in amplitude to the amplitude variations of the converted light, and indicating the amplitude variation of said variations of said electric signal.

8. A method according to claim 7, in which the electric signal is amplified.

9. A method of emission spectrometry comprising the steps of subjecting a vapor consisting of the substance to be analyzed to a radio-frequency excitation to produce radiation of light frequencies modulated to vary in amplitude at radio-frequency, detecting and converting the isolated portion of light into an electric signal varying in amplitude at radio-frequency and proportional in amplitude to the amplitude variations of the converted light, and indicating the amplitude variation of said electric signal.

10. A method according to claim 9, in which the electric signal is amplified.

11. A spectrometer for examining at least a portion of the emission characteristics of a substance, comprising a tube, vapor in said tube consisting of the substance to be examined, means for exciting said vapor at radio-frequency to cause emission of at least one band of radio-frequency amplitude modulated light, means for selecting a substantially monochromatic light, a photosensitive device for receiving said light and for converting said light to electrical energy, means for amplifying said electrical energy at radio-frequency which is a whole number multiple of the frequency of the exciting current for said vapor, and electronic means for examining the position in the spectrum, the width and the intensity of said band.

12. A spectrometer for examining the emission characteristics of a substance comprising a tube, vapor in said tube consisting of the substance to be examined, means for exciting said vapor at radio-frequency to cause emission of light radiation amplitude modulated at radio-frequency, optical means for transforming the light from said tube into a point source, an optical dispersing system positioned to receive light from said source, a light sensitive system positioned to receive light from said dispersing system to convert said light into radio-frequency current having amplitude variations at a frequency corresponding to said radio-frequency amplitude modulated light and varying in amplitude intensities for the different light frequencies of the light radiation in accordance with the characteristic emission spectrum of the substance, and radio-frequency means for amplifying the current output of said light sensitive element.

13. A spectrometer for examining the emission characteristics of a substance comprising a vapor discharge source said vapor consisting of the substance to be examined, means for exciting said vapor at radio-frequency to cause emission of light radiation amplitude modulated at radio-frequency, a collimator, disposed in the path of said light to transform it into parallel rays, an optical dispersing system positioned to intercept said parallel rays, a slit positioned to isolate a portion of the dispersed light coming from said dispersing system, a light sensitive system positioned to receive light from said slit and to convert said light into impulses of non reversed electrical current having amplitude variations, at a frequency corresponding to said radio-frequency amplitude modulated light and varying in amplitude intensities for the different light frequencies of light radiation in accordance with the characteristic emission spectrum of the substance and radio-frequency means for amplifying the current output of said light sensitive element.

14. A spectrometer for analyzing and comparing at least two substances comprising means for producing at least two radio-frequency amplitude modulated light rays carrying the spectral characteristics of the substances to be compared respectively for each substance, a collimator, means selectively directing said light rays from respective substance through said collimator, means for diffracting said light rays means for selecting a substantially monochromatic light photosensitive means for detecting and converting said monochromatic light rays into electric current of radio-frequency having amplitude variations at a frequency corresponding to the modulation frequency of the light rays, and means responsive to said electric current for indicating the spectral characteristics of said substances.

15. A spectrometer for analyzing and comparing at least two substances comprising at least two tubes containing vapors of the respective substances to be examined, means for exciting said vapor at radio-frequency to cause emission of radio-frequency amplitude modulated light, means for diffracting said light, means for selectively directing said light from respective substances through said diffracting means, means for selecting substantially monochromatic light, photosensitive means for detecting and converting said monochromatic diffracted light rays into electric energy of radio-frequency having amplitude variations at a frequency corresponding to the frequency of the light, and oscilloscope means for selectively receiving said electric energy corresponding to respective light sources and transmitting said electric energy to selected positions on a retentive oscilloscope screen for comparison.

16. A spectrometer according to claim 15 in which said selective light directing means comprises at least one mirror surface disposed in the path of light from both sources and having a first position in which the light received from a first substance is reflected through said diffracting means, and at least one other position in which the light from at least one other substance is directed through said diffracting means, and means for moving said mirror surface to said positions.

17. A spectrometer for examining the emission characteristics of a substance comprising; a vapor discharge source consisting of a transparent jacket, removable means for retaining a vacuum in said jacket, a plurality of electrodes in said jacket, at least one of which consists of the substance to be analyzed, and means vaporizing at least a portion of the electrode consisting of the substance to be analyzed; means for exciting said vapor at radio-frequency to cause emission of light radiation amplitude modulated at radio-frequency; a collimator disposed in the path of said light to transform it into parallel rays; an optical dispersing system positioned to intercept said parallel rays; a slit positioned to isolate a portion of the dispersed light coming from said dispersing system; and a detecting and converting unit comprising, a light sensitive element for receiving the light from said slit and including an electron multiplier, a tuned amplifier and means coupling the output of said photosensitive element with said tuned amplifier, said means including a resonant circuit for converting the electrical energy in the output of said photosensitive element utilizing the charge and discharge of the condenser of said resonant circuit, the charge being provoked by the periodical and non-reversed current pulses which appear in the output of said photosensitive element and means for measuring the output of said tuned amplifier.

18. An electronic emission spectrometer comprising means for applying radio frequency excitation to a sample in vapor form so that the light radiation emitted by the sample is modulated at a radio frequency, means for selecting a monochromatic portion of said light radiation, means for receiving said portion of radio frequency modulated radiation and subjecting the said radiation to electronic spectroscopic examination, said last-named means including radio frequency detecting means for converting said selected monochromatic portion of said light radiation into radio frequency energy and means for measuring the amplitude of said radio frequency energy which is proportional to the amplitude of said monochromatic portion of light radiation.

19. An electronic spectrometer for examining the light emission characteristic of a substance, comprising a radio frequency oscillator for amplitude modulating said light emission at radio frequency, and means for subjecting the said radio frequency modulated light radiation to electronic spectroscopic examination, said means being capable of detecting a selected monochromatic portion of said radio frequency modulated light and of converting it into radio frequency energy and of measuring the amplitude of said radio frequency energy which is proportional to the amplitude of said monochromatic portion.

20. An electronic spectrometer for examining the emission characteristics of a substance, comprising a source of light consisting of a vapor discharge tube having two inside electrodes, said vapor consisting of the substance to be examined, means for applying solely radio frequency excitation to said electrodes so that the light radiation emitted by said vapor is modulated at a frequency corresponding to the excitation frequency or to a harmonic thereof and further means adapted to receive said radio frequency modulated radiation for subjecting it to electronic spectroscopic examination including detecting means operating at radio frequency and capable of converting an isolated monochromatic portion of said radio frequency modulated light into radio frequency energy, means for amplifying said energy at radio frequency, and means for measuring the amplitude of said amplified radio frequency energy which is proportional to the amplitude of said isolated monochromatic portion.

21. An electronic emission spectrometer as claimed in claim 18, wherein the said radio frequency excitation is in the form of periodical and very short direct current pulses consisting in radio frequency transients.

22. An electronic emission spectrometer as claimed in claim 18, wherein the said radio frequency excitation is in the form of brief periodical pulses comprising trains of radio frequency waves.

23. An electronic emission spectrometer as claimed in claim 20 in which said excitation means includes means for modifying the radio frequency excitation as to wave form, frequency and peak intensity so as to obtain a change from a fundamental spectrum of lines into an entirely distinct spectrum of bands of light frequencies localized in certain parts of the spectrum and characteristic of the substance under the conditions of operation including the design of the vapor tube.

24. An electronic emission spectrometer as claimed in claim 20, in which said two inside electrodes are of the substance whose emission spectrum is to be examined, said tube being evacuated and vacuum sealed, means for applying radio frequency excitation to said electrodes so that the starting of the discharge is possible at low pressure, the radio frequency field at the electrodes facilitating the vaporization of a part of said electrodes so that the light radiation is emitted by a pure vapor of the substance and is radio frequency modulated.

25. An electronic emission spectrometer for examining the emission characteristics of a substance as claimed in claim 20, in which means are provided for maintaining a predetermined pressure in the vapor tube during operation.

26. An electronic spectrometer as claimed in claim 18, in which said detecting and measuring means comprise a light sensitive device positioned to receive a selected monochromatic portion of said radio frequency modulated light and capable of response at radio frequency, said light sensitive device delivering a unidirectional non-reversed electric current varying in instantaneous intensity according to the waveform and intensity of the incident radio frequency modulated light, said varying current resulting in positive current impulses, an output electrical circuit connected to said light sensitive device for loading and for coupling said device, said circuit utilizing the positive impulses so that the waveform is not distorted and that no demodulation effect can take place, thereby allowing the incident light to be converted into radio frequency energy, a radio frequency amplifier coupled to said output circuit and tuned according to the frequency of said positive impulses for amplifying said radio frequency energy, and means for measuring said amplified energy.

27. An electronic emission spectrometer as claimed in claim 26, wherein radiation is emitted by two samples whose emission spectra are to be compared, and means for applying said radiations to the radiation sensitive device in alternation.

28. An electronic emission spectrometer for examining the emission characteristics of a substance with electronic means including a light source consisting in a vapor discharge tube having two inside electrodes made of said substance which emission spectrum is to be examined, said tube being evacuated and vacuum made prior to operation, means for applying radio frequency excitation to said electrodes for starting the discharge at low pressure causing vaporization of part of said electrodes and for modulating the light output emitted by the pure vapor of the substance at radio frequency, and further means adapted to fit said modulation of the light at radio frequency for subjecting the said light radiation to electronic spectroscopic examination, said means including a monochromator, a light sensitive device capable of operation in radio frequency and positioned to receive a selected monochromatic portion of said radio frequency modulated light, a convenient output circuit for loading said light sensitive device without distortion or demodulation effects due to the varying unidirectional output current of said sensitive device so that said radio frequency modulated light can be converted into radio frequency energy, tunable means coupled to said circuit for amplifying said energy at radio frequency, and means for indicating without demodulation the instantaneous amplitude of said amplified radio frequency energy whereby a continuous measurement can be obtained for each instantaneous amplitude value of said monochromatic light during a radio frequency cycle of modulation, the whole set of measurements for a cycle being repeated at radio frequency, thereby resulting in more accuracy and sensitivity.

29. An electronic spectrometer according to claim 18, in which said detecting and measuring means comprise, a light sensitive device positioned to receive a selected monochromatic portion of said radio frequency modulated light, said light sensitive device delivering a unidirectional non-reversed electric current varying in instantaneous intensity according to the waveform and intensity of the incident radio frequency modulated light, said varying current resulting in positive current impulses, an output electrical circuit connected to said light sensitive device for loading and for coupling said device, said circuit being a tuned resonant circuit in which said current pulses periodically charge the condenser of said resonant circuit at the frequency of the pulses, a radio frequency amplifier coupled to said circuit, and means for measuring the amplified energy.

References Cited in the file of this patent

UNITED STATES PATENTS

| | | |
|---|---|---|
| 1,558,583 | Bock | Oct. 27, 1925 |
| 1,628,256 | Machlett | May 10, 1927 |
| 1,878,873 | Maradei | Sept. 20, 1932 |
| 1,991,426 | Simons | Feb. 19, 1935 |
| 2,326,853 | Harrison | Aug. 17, 1943 |
| 2,335,621 | Thompson et al. | Nov. 30, 1943 |
| 2,407,564 | Martin et al. | Sept. 10, 1946 |
| 2,407,838 | Kliever | Sept. 17, 1946 |

(Other references on following page)

UNITED STATES PATENTS

| | | | |
|---|---|---|---|
| 2,417,023 | Sweet | Mar. 4, | 1947 |
| 2,442,493 | Heyn | June 1, | 1948 |
| 2,444,560 | Feldt et al. | July 6, | 1948 |
| 2,503,165 | Meyer | Apr. 4, | 1950 |
| 2,509,649 | Norman | May 30, | 1950 |
| 2,519,154 | Schroeder et al. | Aug. 15, | 1950 |
| 2,538,062 | Touvet | Jan. 16, | 1951 |
| 2,544,078 | Glassbrook | Mar. 6, | 1951 |
| 2,559,688 | Touvet | July 10, | 1951 |

OTHER REFERENCES

Sawyer: "Experimental Spectroscopy," published by Prentice-Hall, Inc., New York city, 1946, pages 25, 26 and 27.

Harrison et al.: "Practical Spectroscopy," published by Prentice-Hall, Inc., New York city, 1948, page 192.